US010049058B2

(12) United States Patent
Colline

(10) Patent No.: US 10,049,058 B2
(45) Date of Patent: Aug. 14, 2018

(54) METHOD FOR RESOLVING A CABLE MISMATCH IN A TARGET DEVICE

(71) Applicant: Dot Hill Systems Corporation, Longmont, CO (US)

(72) Inventor: Phillip Raymond Colline, Tustin, CA (US)

(73) Assignee: Seagate Technology LLC, Cupertino, CA (US)

( * ) Notice: Subject to any disclaimer, the term of this patent is extended or adjusted under 35 U.S.C. 154(b) by 536 days.

(21) Appl. No.: 14/725,189

(22) Filed: May 29, 2015

(65) Prior Publication Data
US 2016/0350239 A1    Dec. 1, 2016

(51) Int. Cl.
*G06F 13/10* (2006.01)
*G06F 13/42* (2006.01)
*G06F 13/38* (2006.01)

(52) U.S. Cl.
CPC ........ *G06F 13/102* (2013.01); *G06F 13/4247* (2013.01)

(58) Field of Classification Search
None
See application file for complete search history.

(56) References Cited

U.S. PATENT DOCUMENTS

| 8,582,443 | B1 * | 11/2013 | Sun | H04L 43/16 370/242 |
| 8,856,395 | B2 * | 10/2014 | Madhusudana | G06F 13/385 710/15 |

* cited by examiner

*Primary Examiner* — Scott Sun
(74) *Attorney, Agent, or Firm* — Thomas J. Lavan

(57) ABSTRACT

A method for method for resolving a cable mismatch by a target device is provided. The method includes determining that all PHYs in a receptacle are currently inactive, a PHY in the receptacle became active, and determining if there is a mismatch between a cable type and a stored cable configuration. If there is a mismatch between the cable type and the stored cable configuration, the method further includes disabling all other PHY groups in the receptacle that do not include the PHY that became active and notifying a user that a cable mismatch corresponding to the receptacle has occurred. If there is not a mismatch between the cable type and the stored cable configuration, then the method includes re-enabling PHYs in the receptacle, if any PHYs are disabled, and notifying a user that a cable mismatch corresponding to the receptacle has been corrected.

20 Claims, 14 Drawing Sheets

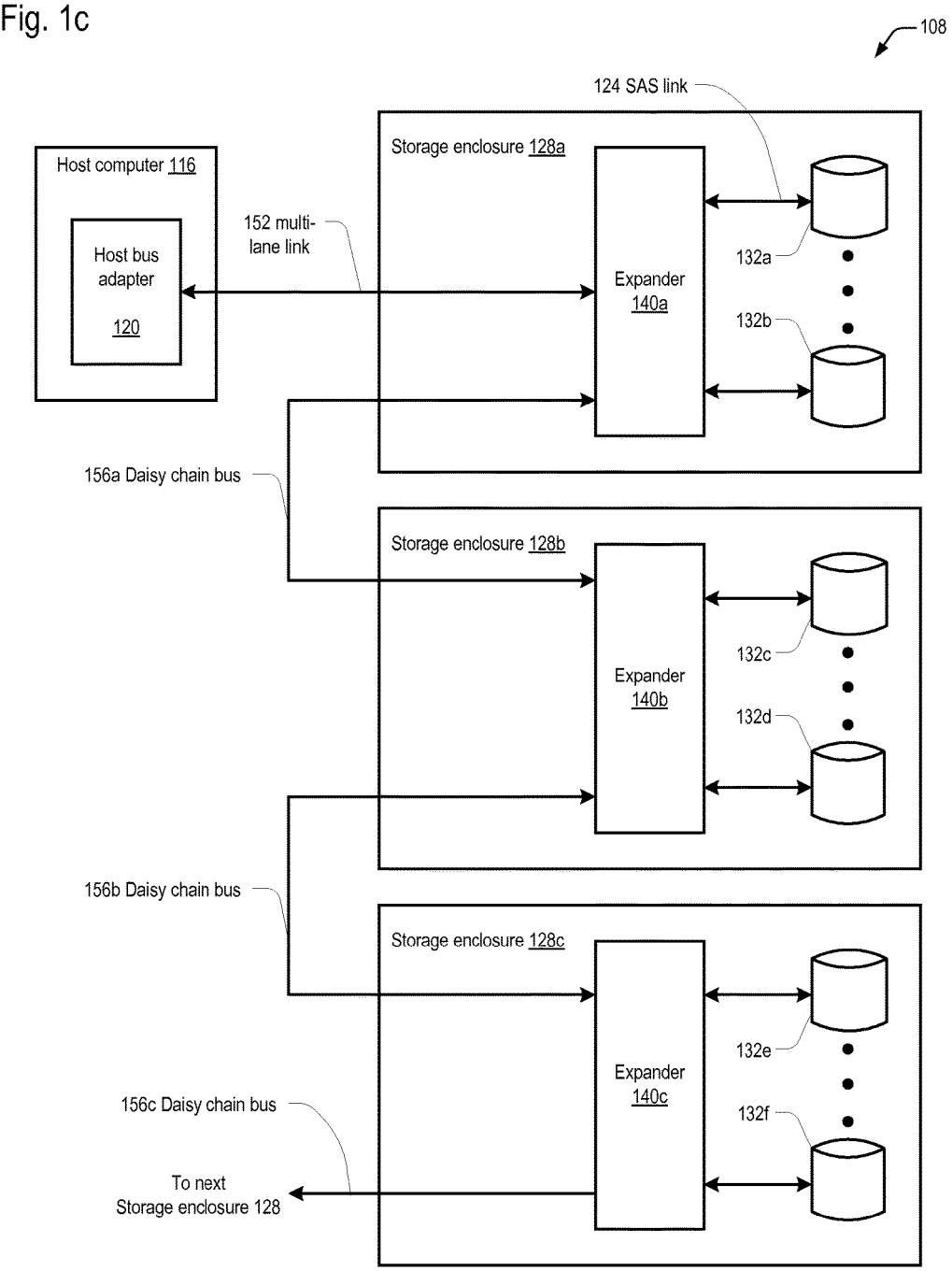

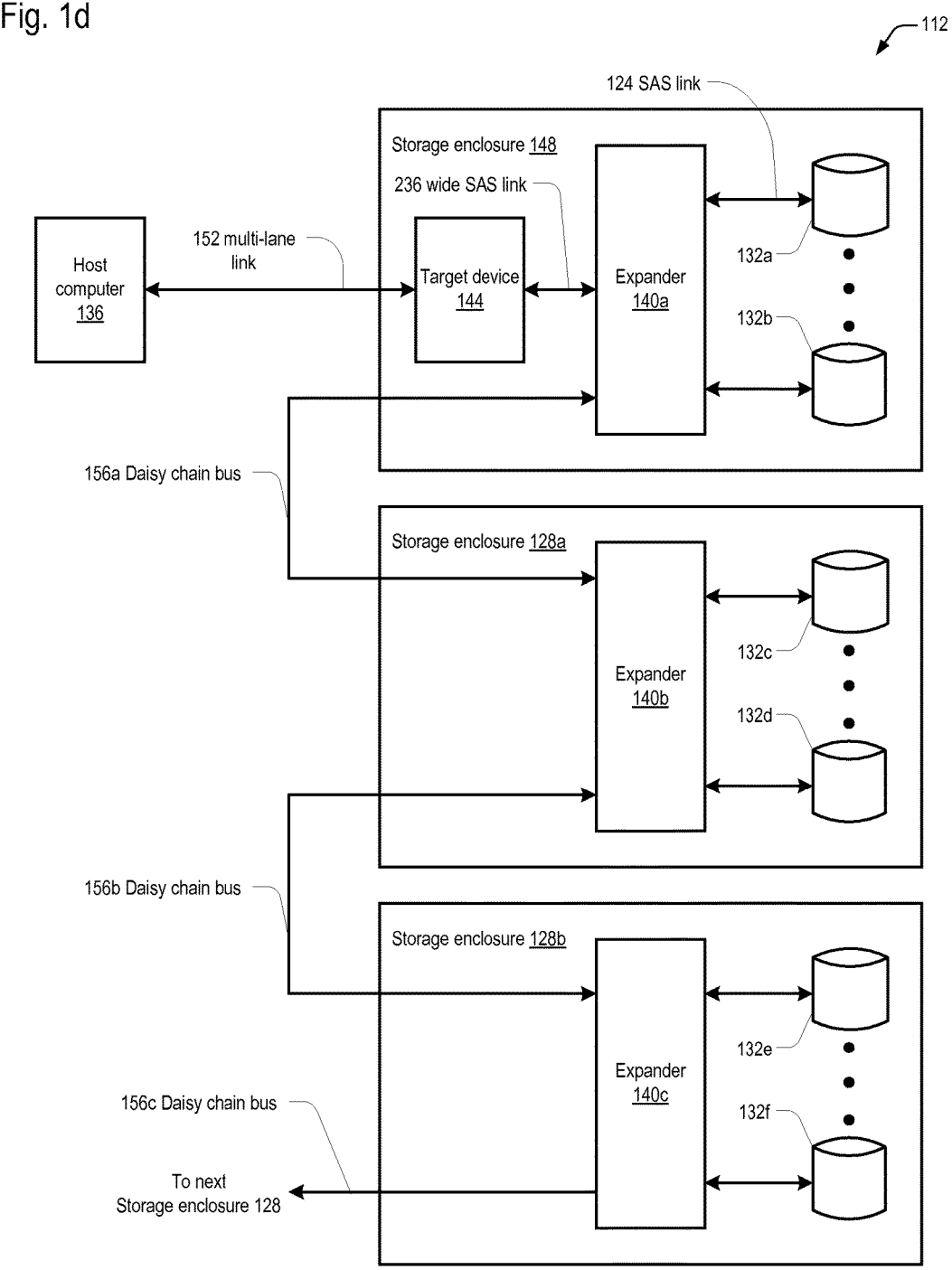

Fig. 2 Target device block diagram
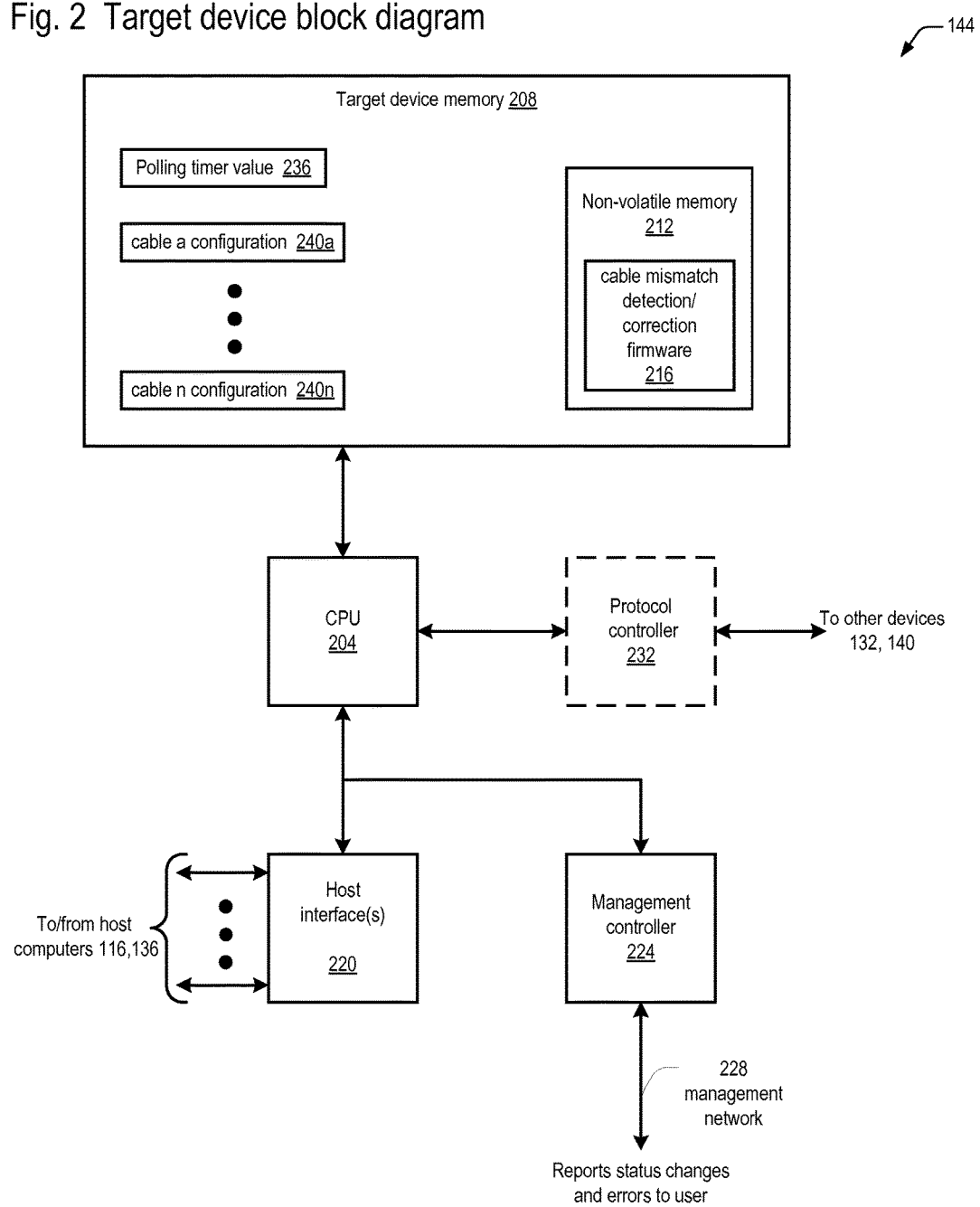

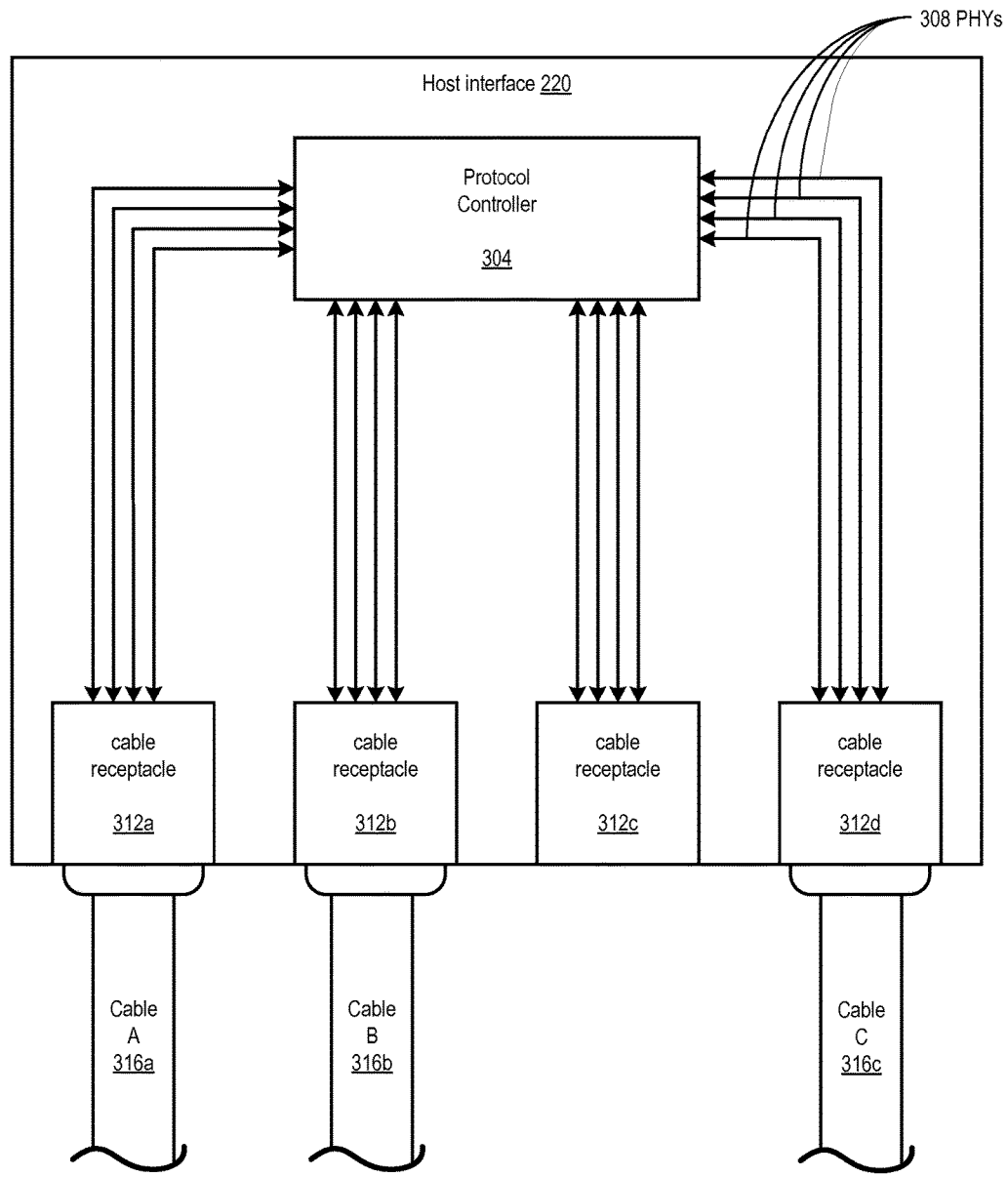

Fig. 4a  Correct cable configuration with straight cable
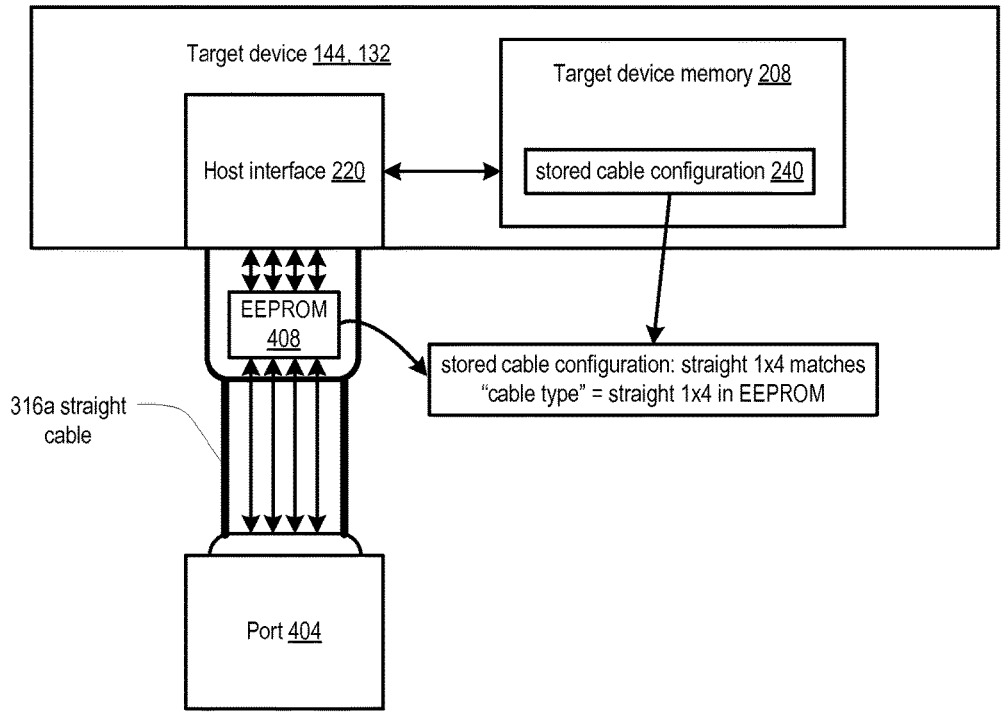
Fig. 4b  Correct cable configuration with fanout cable
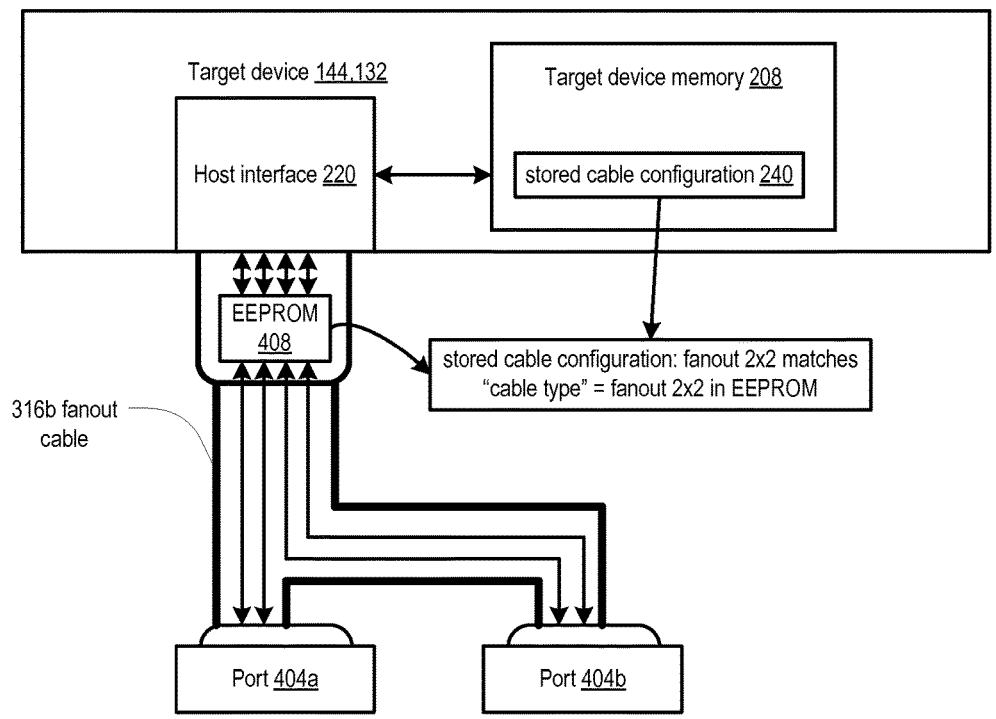

Fig. 5a  Mismatched cable configuration with straight cable
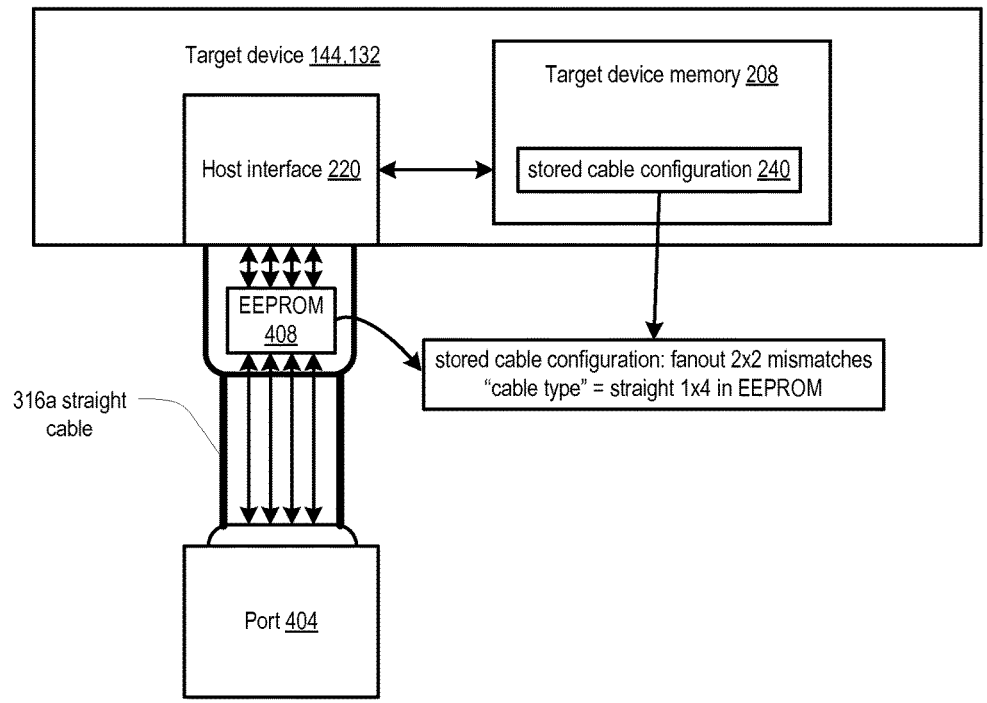
Fig. 5b  Mismatched cable configuration with fanout cable
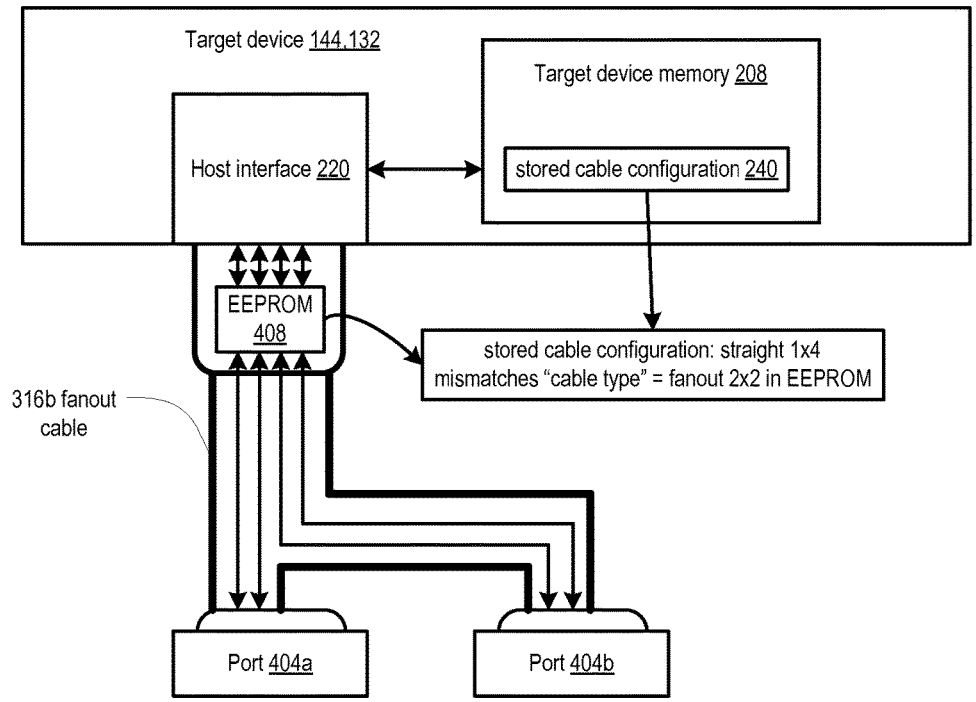

Fig. 6a PHY groups in a 4-lane to dual 2-lane fanout cable when stored cable configuration is in 2X2 fanout cable mode
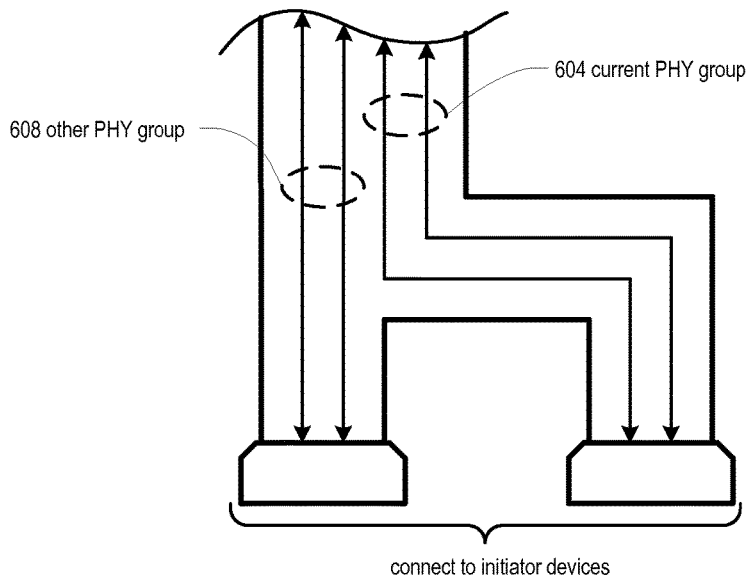
connect to initiator devices
Fig. 6b PHY groups in a 4-lane to quad 1-lane fanout cable when stored cable configuration is in 2X2 fanout cable mode
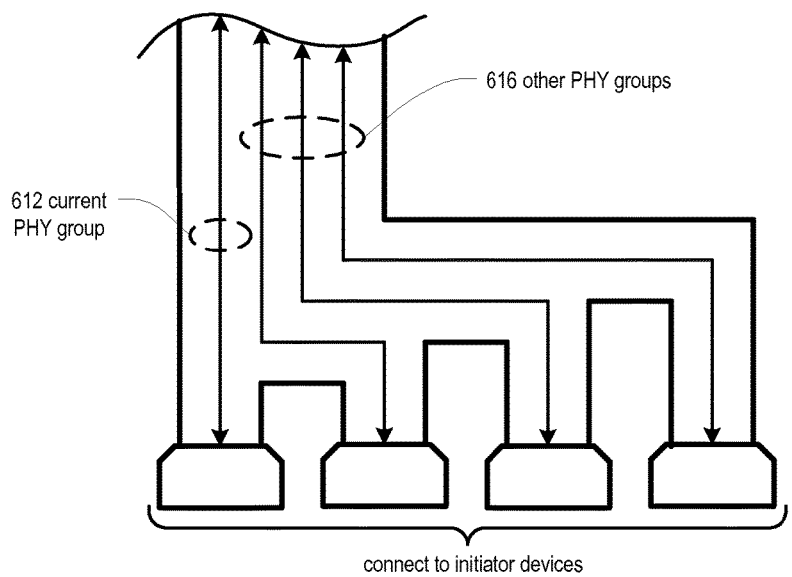
connect to initiator devices Fig. 6c PHY groups in a 4-lane straight cable when stored cable configuration is in 2X2 fanout cable mode
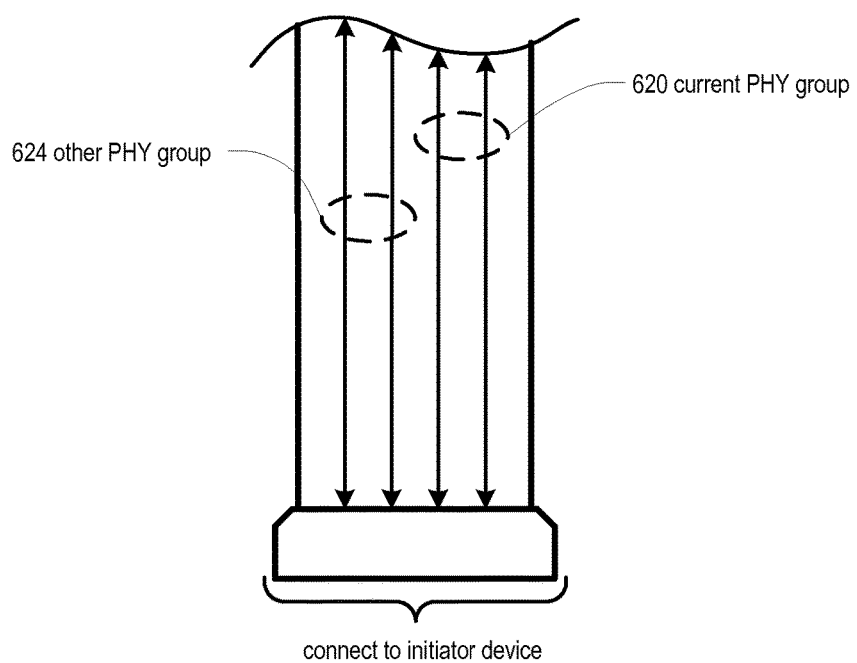

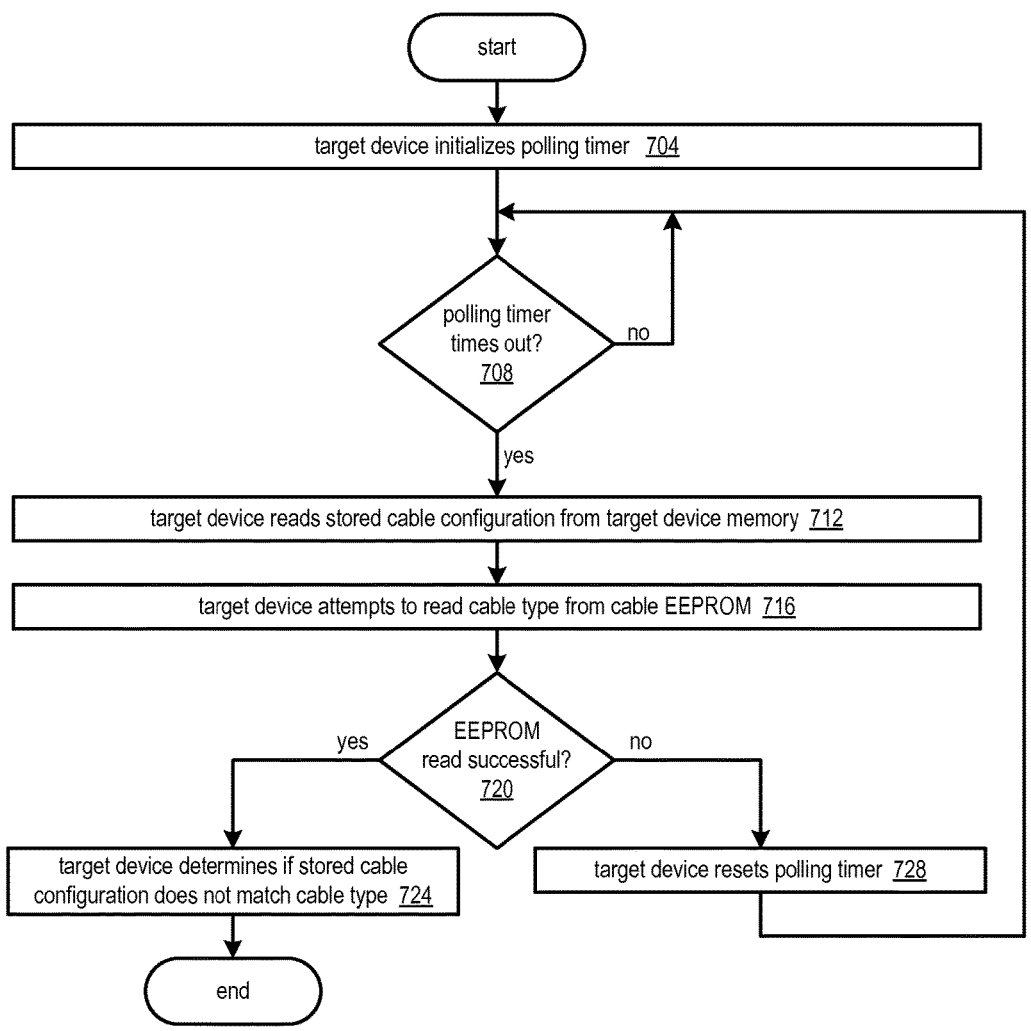
Fig. 7 Generalized polling process to detect cable mismatch

Fig. 8 Generalized PHY up process to detect cable mismatch
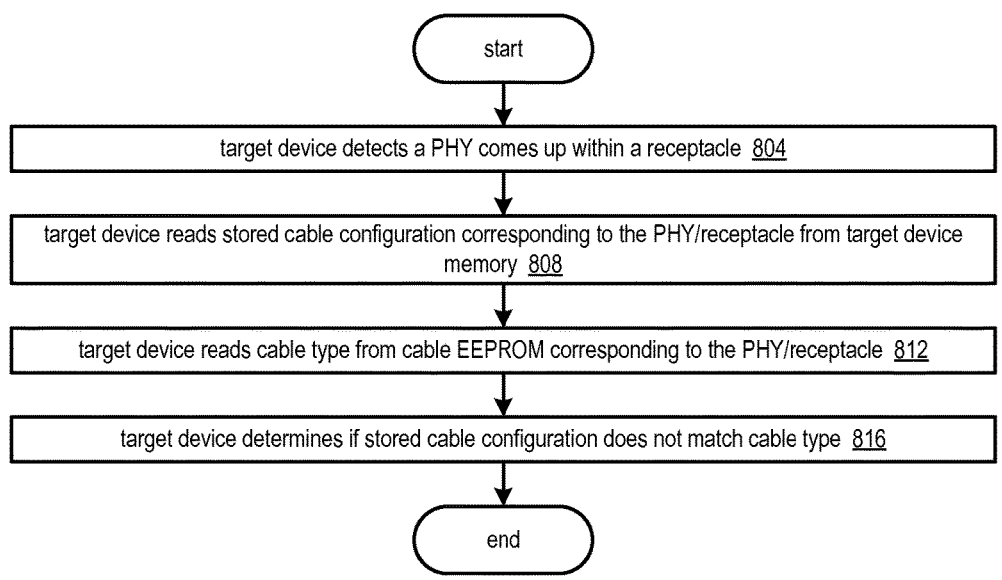

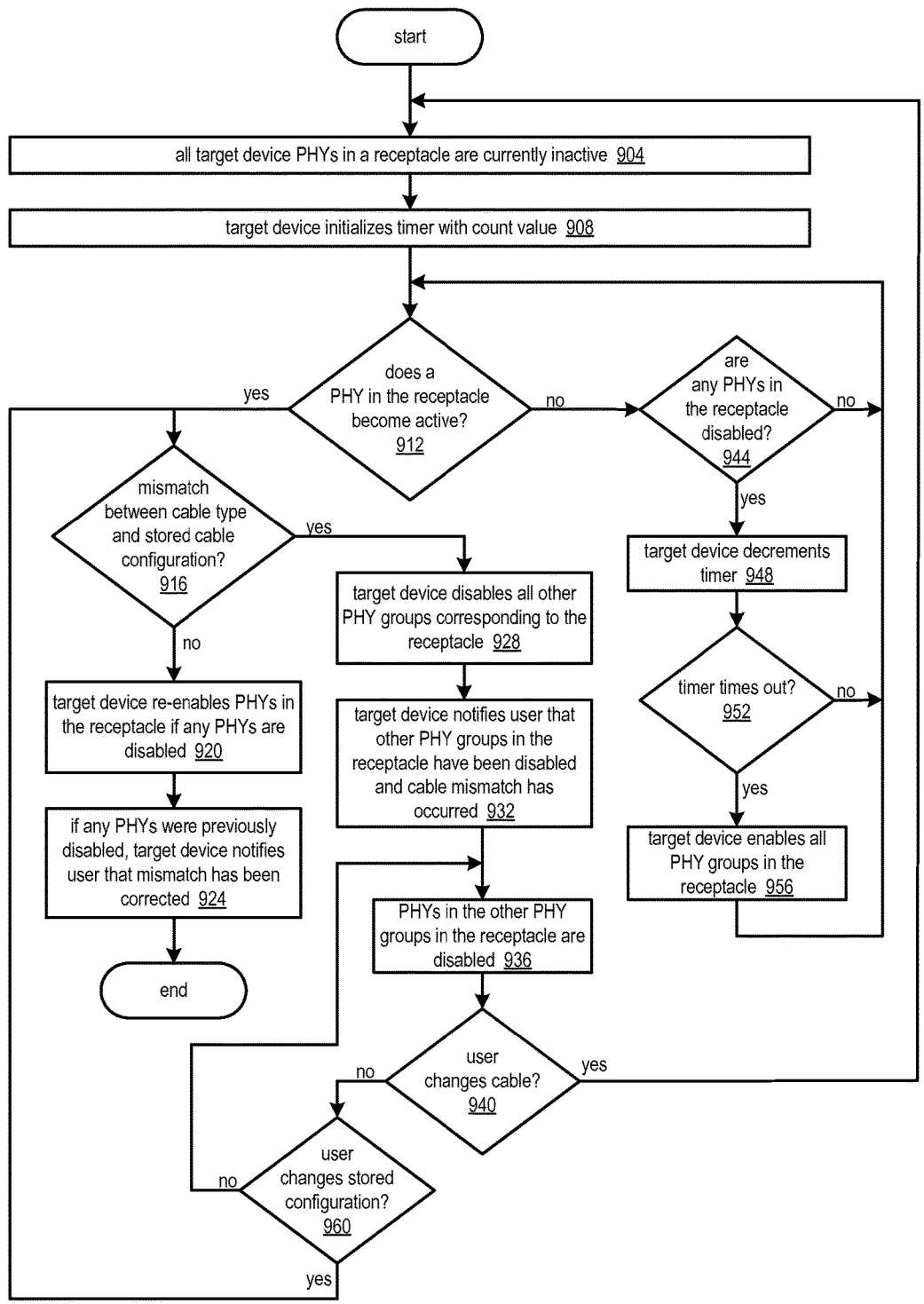
Fig. 9 First embodiment of cable mismatch detection process

Fig. 10 Second embodiment of cable mismatch detection process
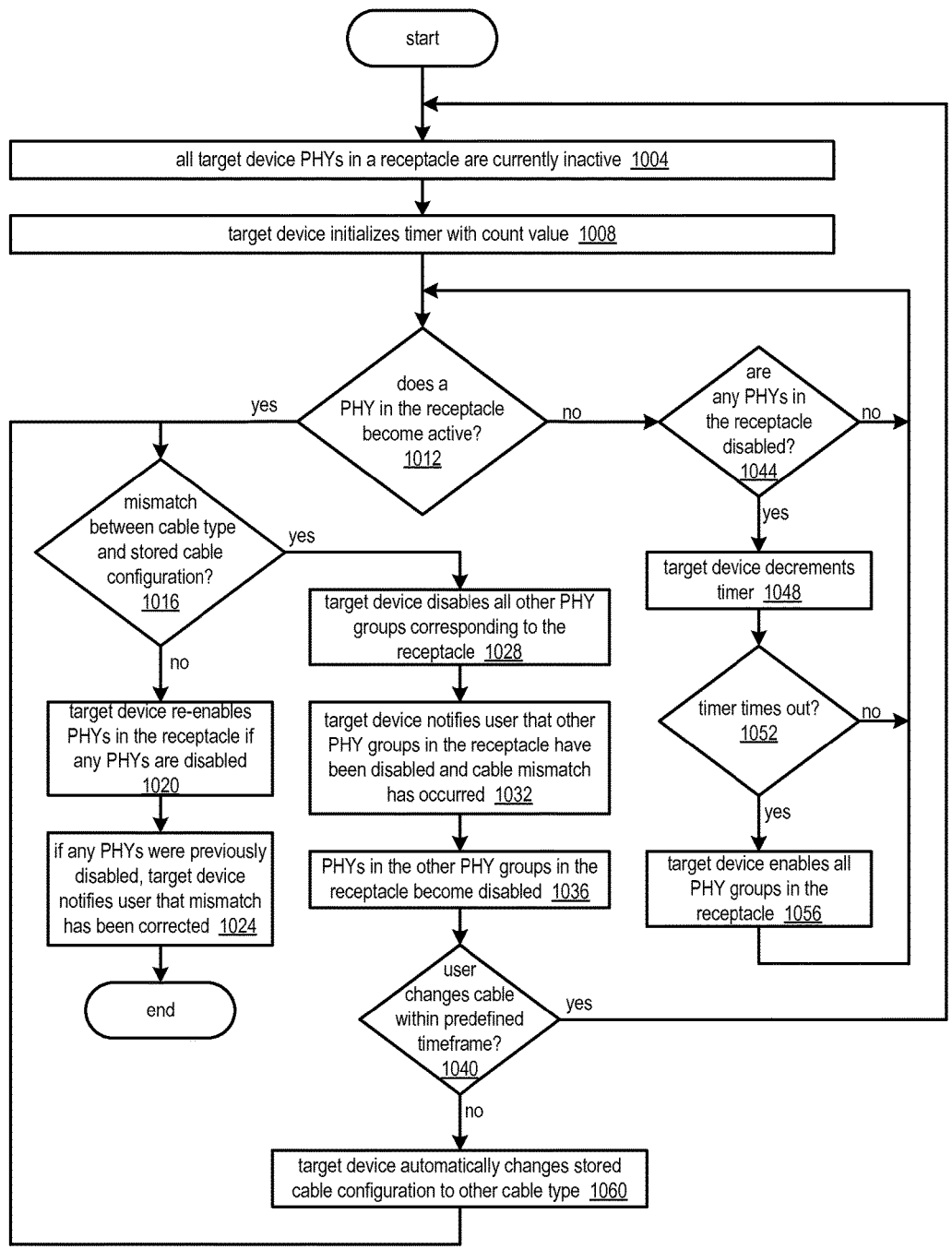

Fig. 11 Third embodiment of cable mismatch detection process
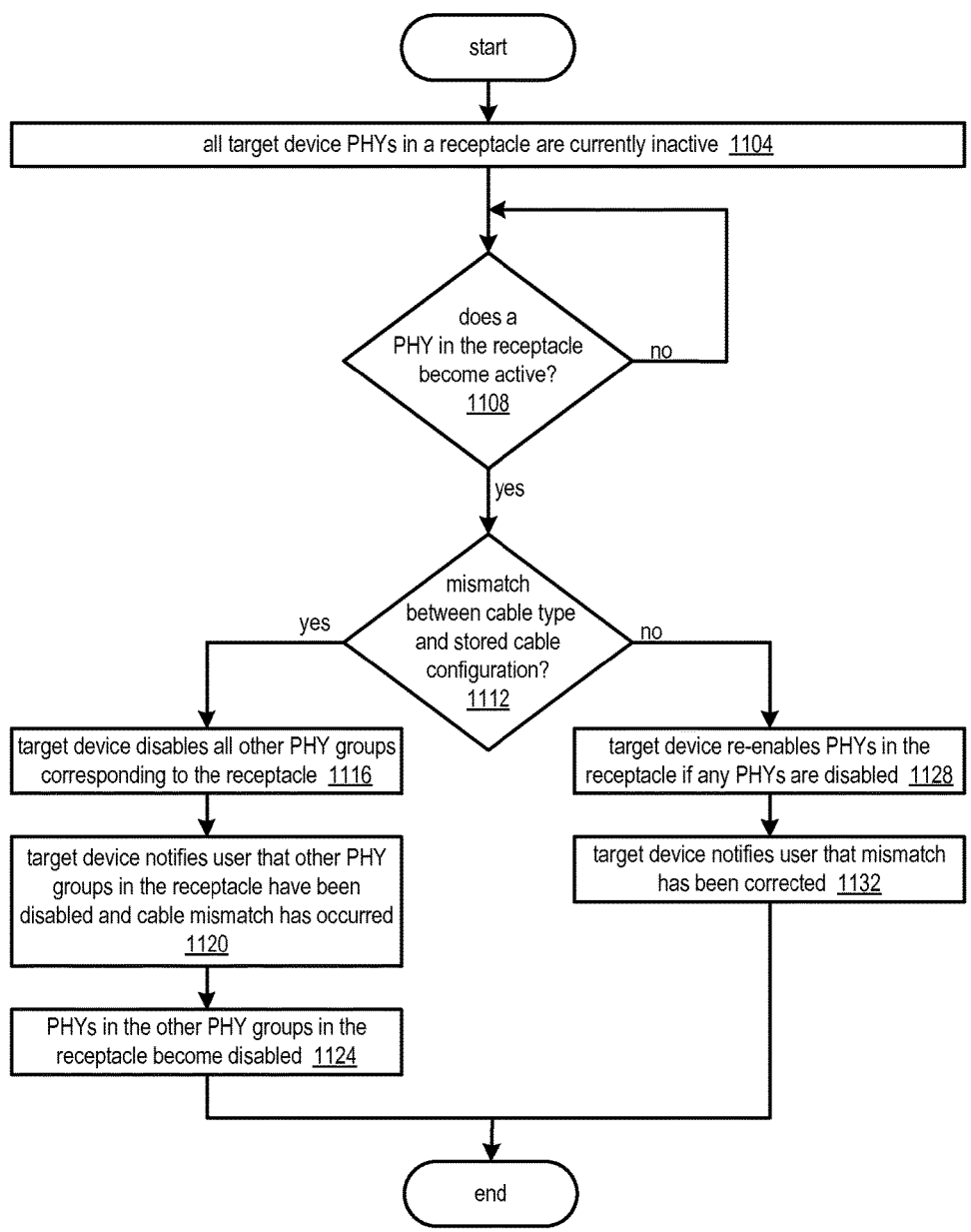

US 10,049,058 B2

METHOD FOR RESOLVING A CABLE MISMATCH IN A TARGET DEVICE

FIELD

The present invention is directed to computer data storage interfaces. In particular, the present invention is directed to methods for resolving cable type mismatches between initiator and target devices, within the target devices.

BACKGROUND

Serial-Attached-SCSI (SAS) systems are becoming more common in modern computing and data processing systems. SAS systems include SAS initiator devices and SAS target devices as does its parent, the Small Computer Systems Interface (SCSI). SAS target devices are typically storage devices, such as disk drives, that receive commands from SAS initiator devices, such as SAS host bus adapters in host computers or SAS I/O controllers in Redundant Arrays of Inexpensive Disks (RAID) controllers.

Implementations and uses of SAS are described in detail in the following documents, each of which is incorporated by reference in its entirety for all intents and purposes:

"Serial Attached SCSI-2.1 (SAS-2.1)", Revision 02, 19 May 2009. Working Draft, Project T10/2125-D, American National Standard Institute.

"Information technology—SAS Protocol Layer (SPL)", Revision 02, 19 May 2009. Working Draft, Project T10/2124-D, American National Standard Institute.

SAS systems are built on point-to-point serial connections between SAS devices. Each point-to-point connection is referred to as a link, and the two endpoints are individually referred to as a PHYsical Interface (PHY). A PHY contains a transmitter device (TX) and a receiver device (RX) and electrically interfaces to a link to communicate with another PHY at the other end of the link. The link includes two differential signal pairs; one pair in each direction. A SAS port includes one or more PHYs. A SAS port that has more than one PHY grouped together is referred to as a wide port, and the more than one link coupling the two wide ports are referred to as a wide link. Wide ports and wide links provide increased data transfer rates between SAS endpoints and enable multiple simultaneous connections to be open between a SAS initiator and multiple SAS targets.

The simplest SAS topology is a single SAS initiator having a SAS port that is connected by a single SAS link to a SAS port of a single SAS target. However, it is desirable in many applications, such as a high data availability RAID system, to enable one or more SAS initiators to communicate with multiple SAS target devices. In addition to initiators and targets, SAS includes a third type of device, expanders, which are employed in SAS systems to achieve more complex topologies. SAS expanders perform switch-like functions, such as routing, to enable SAS initiators and targets to communicate via the SAS point-to-point connections.

Other interfaces, including gigabit Ethernet, utilize the concept of multi-lane communication paths within a single cable or cable receptacle.

SUMMARY

The present invention is directed to solving disadvantages of the prior art. In accordance with embodiments of the present invention, a method for resolving a cable mismatch by a target device is provided. The method includes determining, by the target device, that all PHYs in a cable receptacle are currently inactive. The cable receptacle is configured to accept a cable that connects the target device with one or more initiator devices. The method also includes determining, by the target device, that a PHY in the cable receptacle became active. A PHY becomes active includes a cable is plugged into the cable receptacle and a non-disabled initiator device is plugged into the cable. The method further includes determining, by the target device, if there is a mismatch between a cable type and a stored cable configuration. The cable type is stored in a first memory device of a cable plugged into the cable receptacle, and the stored cable configuration is stored in a second memory device in the target device. If there is a mismatch between the cable type and the stored cable configuration, the method includes disabling, by the target device, all other PHY groups in the cable receptacle that do not include the PHY that became active and notifying, by the target device, a user that a cable mismatch corresponding to the cable receptacle has occurred. If there is not a mismatch between the cable type and the stored cable configuration, then the method includes re-enabling, by the target device, PHYs in the cable receptacle, if any PHYs are disabled and notifying a user that a cable mismatch corresponding to the cable receptacle has been corrected.

In accordance with other embodiments of the present invention, a method for resolving a cable mismatch between a target device and one or more initiator devices is provided. The method includes determining, by the target device, that all PHYs in a cable receptacle are currently inactive, initializing a timer with a count value, and determining if a PHY in the cable receptacle becomes active. If a PHY in the cable receptacle becomes active, then the method includes determining, by the target device, if there is a mismatch between a cable type and a stored cable configuration, and resolving the mismatch if there is a mismatch between the cable type and the stored cable configuration. The cable type is stored in a cable plugged into the cable receptacle, and the stored cable configuration is stored in the target device. If a PHY in the cable receptacle does not become active, then the method includes determining, by the target device, if any PHYs in the receptacle are disabled. Disabled PHYs are PHYs whereby the target device caused a protocol controller coupled to the PHYs to prevent the PHYs from receiving or transmitting data. If no PHYs in the cable receptacle are disabled, then the method includes repeating determining if a PHY in the cable receptacle becomes active. If any PHYs in the cable receptacle are disabled, then the method includes decrementing the timer and determining, by the target device, if the timer times out. If the timer times out, then the method includes enabling, by the target device, all PHYs in the cable receptacle and repeating determining if a PHY in the cable receptacle becomes active. If the timer does not time out, then the method includes repeating determining a PHY in the cable receptacle becomes active.

Advantages of the present invention include improved target system reliability. If not addressed, cable mismatches can lead to I/O timeouts, unavailable or inconsistently available volumes, double images of volumes, and similar problems. Alternatively, a user could disable all PHYs in a target port experiencing a cable mismatch. However, in that case inefficient polling as illustrated in FIG. 7 would be required in order for the target device to know when a cable mismatch had been corrected.

Another advantage of the present invention is that it is usable for all types of multi-lane interfaces between initiators and target devices that can benefit from using fanout cables to increase the number of supported initiator devices. Fanout cables connect a single target device receptacle with a plurality of initiator devices.

Yet another advantage of the present invention is it provides methods for resolving cable mismatches between one or more initiator devices and a target device without requiring host interface reset or rebooting the target device. Thus, minimal system disruption is required which saves time and mitigates restarting initiator or target operation.

Another advantage of the present invention is a faster means of making an interface operable in the event of a cable mismatch. Conventional methods simply disable the PHYs upon a mismatch and either poll or wait for a system administrator action. A user or system administrator manually indicates the situation has been resolved.

Additional features and advantages of embodiments of the present invention will become more readily apparent from the following description, particularly when taken together with the accompanying drawings.

BRIEF DESCRIPTION OF THE DRAWINGS

FIG. 1c is a block diagram illustrating components of a third electronic data storage system incorporating one or more data storage systems in accordance with embodiments of the present invention.

FIG. 1d is a block diagram illustrating components of a fourth electronic data storage system incorporating one or more data storage systems in accordance with embodiments of the present invention.

FIG. 2 is a block diagram illustrating components of a target device in accordance with embodiments of the present invention.

FIG. 3 is a block diagram illustrating components of a host interface in accordance with embodiments of the present invention.

FIG. 4a is a block diagram illustrating a correct cable configuration incorporating a straight cable in accordance with embodiments of the present invention.

FIG. 4b is a block diagram illustrating a correct cable configuration incorporating a fanout cable in accordance with embodiments of the present invention.

FIG. 5a is a block diagram illustrating a mismatched cable configuration incorporating a straight cable in accordance with the embodiments of the present invention.

FIG. 5b is a block diagram illustrating a mismatched cable configuration incorporating a fanout cable in accordance with embodiments of the present invention.

FIG. 6a is a block diagram illustrating PHY groups in a 4-lane to dual 2-lane fanout cable when the stored cable configuration is in 2×2 fanout cable mode in accordance with embodiments of the present invention.

FIG. 6b is a block diagram illustrating PHY groups in a 4-lane to quad 1-lane fanout cable when the stored cable configuration is in 2×2 fanout cable mode in accordance with embodiments of the present invention.

FIG. 6c is a block diagram illustrating PHY groups in a 4-lane straight cable when the stored cable configuration is in 2×2 fanout cable mode in accordance with embodiments of the present invention.

FIG. 7 is a flowchart illustrating a generalized polling process to detect cable mismatch in accordance with embodiments of the present invention.

FIG. 8 is a flowchart illustrating a generalized PHY up process to detect cable mismatch in accordance with embodiments of the present invention.

FIG. 9 is a flowchart illustrating a cable mismatch detection process in accordance with a first embodiment of the present invention.

FIG. 10 is a flowchart illustrating a cable mismatch detection process in accordance with a second embodiment of the present invention.

FIG. 11 is a flowchart illustrating a cable mismatch detection process in accordance with a third embodiment of the present invention.

DETAILED DESCRIPTION

The present inventor has observed various problems in complex topology systems having many paths between initiators and targets. Such systems include, but are not limited to, data storage systems. Target systems sometimes require direct connection to many client or server initiator systems. In some cases, the number of host ports or cables in a given target system may not be able to support connections to a larger number of initiator systems in a direct-connect (i.e., non-networked) environment.

More recent host interfaces, including Serial Attached SCSI (SAS), utilize multi-lane or multi-PHY connections through each host port. These multi-lane/multi-PHY connections utilize one or more lane/PHY connections to each initiator.

In order to support a larger number of initiator systems compared to the available number of host ports or cables in the target system, fanout cables have been developed in order to support two or more initiator systems through each target system host port. Fanout cables include a single target system host port and a plurality of initiator ports. The target system host port includes all of the PHYs in all of the initiator ports.

In order to maintain consistent volume images and reliability between initiators and targets in fanout cable environments, it is necessary for target devices to maintain in memory the same cable configuration as the actual cable interfaced with each target system host port. Thus, when a conventional straight cable is used to interface between the target system host port and a single initiator, the target device must be configured for a straight cable. Similarly, when a fanout cable is used to interface between the target system host port and multiple initiators, the target device must be configured for the same type of fanout cable. The fanout cable must reflect the number of supported initiators as well as the number of PHYs in each initiator port.

Although the present invention is described with respect to SAS technology, it should be understood that the system and processes of the present invention apply to any such point-to-point interface technology that utilizes multiple communication lanes or PHYs that may be split using fanout cables.

Figure 1A:
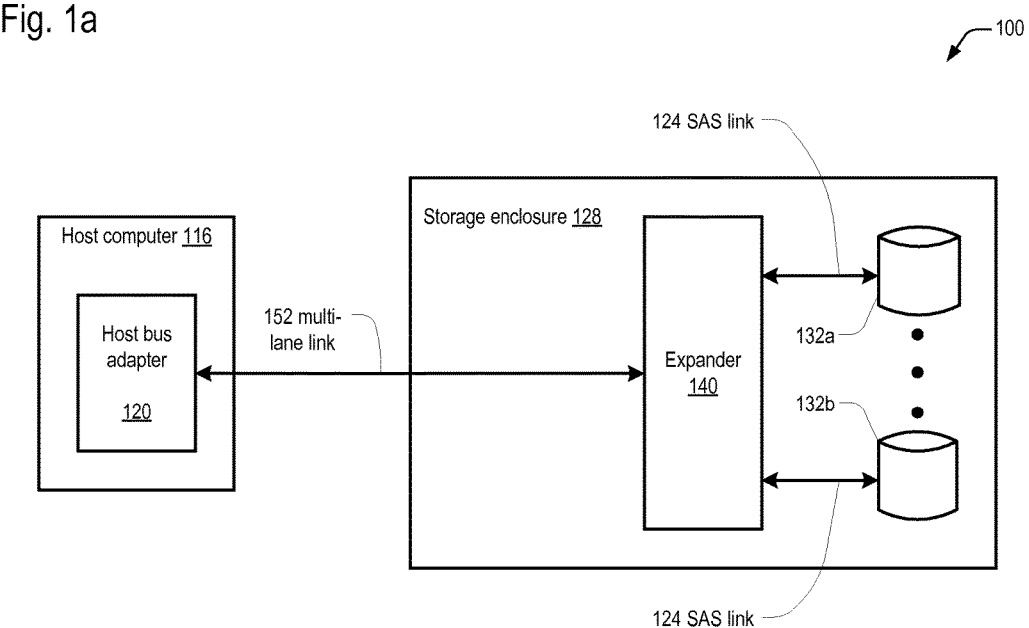
FIG. 1a is a block diagram illustrating components of a first electronic data storage system incorporating a storage enclosure in accordance with embodiments of the present invention.

Referring now to FIG. 1a, a block diagram illustrating components of a first electronic data storage system 100 incorporating a storage enclosure 128 in accordance with embodiments of the present invention is shown. The electronic data storage system 100 includes one or more host computers 116. Host computer 116 is generally a server, but could also be a desktop or mobile computer. Host computer 116 executes application programs that generate read and write requests to storage devices 132*a*, 132*b*. Host computer 116 includes one or more storage controllers 120, although only a single storage controller 120 is illustrated for clarity. In one embodiment, storage controller 120 is a host bus adapter. In another embodiment, storage controller 120 is a RAID controller. In yet another embodiment, storage controller 120 represents a pair of dual redundant RAID controllers. Storage controller 120 may either be integrated on the motherboard of host computer 116, or may be an add-in board or other form of assembly in host computer 116.

Storage controller 120 transfers data to and from storage devices 132*a*, 132*b* in storage enclosure 128, over SAS links 124 and multi-lane SAS link 152. In one embodiment, multi-lane SAS link 152 includes 4 SAS lanes. Storage enclosure 128 includes one or more SAS expanders 140, which perform switching functions, and transfers data and commands between storage controller 120 and storage devices 132*a*, 132*b*. In general, the transmit and receive paths of SAS links 124 to storage devices 132 are single lane SAS connections. However, in the future it is possible each transmit or receive path could be a multiple lane SAS link 152. Each SAS link 124 between SAS expander 140 and storage devices 132 includes separate transmit and receive paths, and each storage device 132 generally has two ports for independent interconnection to different SAS expanders 140. Storage devices 132 are storage peripheral devices including, but not limited to hard disk drives, solid state drives, tape drives, and optical drives.

Figure 1B:
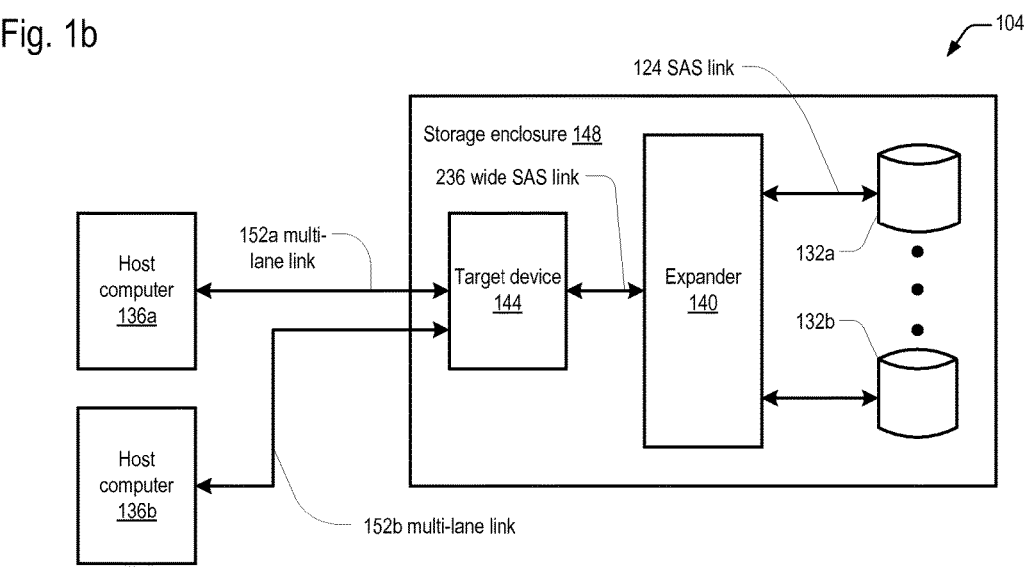
FIG. 1b is a block diagram illustrating components of a second electronic data storage system incorporating a storage enclosure in accordance with embodiments of the present invention.

Referring now to FIG. 1*b*, a block diagram illustrating components of a second electronic data storage system 104 incorporating a storage enclosure 148 in accordance with embodiments of the present invention is shown. Second electronic data storage system 104 includes multiple host computers 136, identified as host computer 136*a* and 136*b*. However, second electronic data storage system 104 may include any number of host computers 136. Storage enclosure 148 is similar to storage enclosure 128, except that one or more target devices 144 are present. In the embodiment illustrated, target device 144 is a storage controller. Target device 144 is described in more detail with respect to FIG. 2. In one embodiment, target device 144 is a RAID controller. In another embodiment, target device 144 represents a pair of dual redundant RAID controllers. In yet another embodiment, target device 144 may be a communications or storage appliance, or even a storage device 132.

Host computers 136 communicate with storage enclosure 148, including target device 144, over multi-lane link 152*a*, 152*b*. Multi-lane links 152 are any suitable bus or network utilizing multiple PHYS in each link 152 that allows high speed data transfer between host computers 136 and target devices 144.

Referring now to FIG. 1*c*, a block diagram illustrating components of a third electronic data storage system 108 incorporating storage enclosures 128 in accordance with embodiments of the present invention is shown. Electronic data storage system 108 is similar to electronic data storage system 100 of FIG. 1*a*, but additional storage enclosures 128*b*, 128*c* are provided to support additional storage devices 132*c*, 132*d*, 132*e*, and 132*f*. In one embodiment, storage controller 120 is a host bus adapter. In another embodiment, storage controller 120 is a RAID controller. In yet another embodiment, storage controller 120 represents a pair of dual redundant RAID controllers. In order to support additional storage enclosures 128*b*, 128*c*, SAS expanders 140 utilize daisy chain buses 156. Daisy chain bus 156 utilizes the same protocol as SAS links 124, and is generally a multi-lane link 152 having 4 SAS lanes. Daisy chain bus 156*a* interconnects SAS expander 140*a* and SAS expander 140*b*. Daisy chain bus 156*b* interconnects SAS expander 140*b* and SAS expander 140*c*. Daisy chain bus 156*c* interconnects SAS expander 140*c* and another storage enclosure 128, in a similar fashion to daisy chain buses 156*a* and 156*b*. In one embodiment, each storage enclosure 128 supports twelve storage devices 132 and each storage controller 120 supports up to 128 storage devices 132. However, in other embodiments each storage enclosure 128 may support more or fewer than 12 storage devices 132, and each storage controller 120 may support more or fewer than 128 storage devices 132.

Referring now to FIG. 1*d*, a block diagram illustrating components of a fourth electronic data storage system 112 incorporating a storage enclosure 148 and multiple storage enclosures 128 in accordance with embodiments of the present invention is shown. Electronic data storage system 112 is similar to electronic data storage system 104 of FIG. 1*b*, but additional storage enclosures 128*b*, 128*c* are provided to support additional storage devices 132*c*, 132*d*, 132*e*, and 132*f*. In one embodiment, target device 144 is a RAID controller. In another embodiment, target device 144 represents a pair of dual redundant RAID controllers. In order to support additional storage enclosures 128*a*, 128*b*, SAS expanders 140 utilize daisy chain buses 156. Daisy chain bus 156 utilizes the same protocol as SAS links 124, and is generally a multi-lane link 152 having 4 SAS lanes. Daisy chain bus 156*a* interconnects SAS expander 140*a* and SAS expander 140*b*. Daisy chain bus 156*b* interconnects SAS expander 140*b* and SAS expander 140*c*. Daisy chain bus 156*c* interconnects SAS expander 140*c* and another storage enclosure 128, in a similar fashion to daisy chain buses 156*a* and 156*b*. In one embodiment, each storage enclosure 128 supports twelve storage devices 132 and each target device 144 supports up to 128 storage devices 132. However, in other embodiments each storage enclosure 128 may support more or fewer than 12 storage devices 132, and each target device 144 may support more or fewer than 128 storage devices 132.

Referring now to FIG. 2, a block diagram illustrating components of a target device 144 in accordance with embodiments of the present invention is shown. Target device 144 includes a CPU 204, which executes stored programs that manage data transfers between host computers 116, 136 and storage devices 132. CPU 204 includes any processing device suitable for executing target device 144 programs, such as Intel x86-compatible processors, embedded processors, mobile processors, field programmable gate arrays (FPGAs) with internal processors, and/or RISC processors. CPU 204 may include several devices including memory controllers, North Bridge devices, and/or South Bridge devices. Host computers 116, 136 generate read and write I/O requests over multi-lane links 152 to host Interface 220. Multiple host computers 116, 136 may interact with target device 144 over multi-lane links 152.

CPU 204 is coupled to target device memory 208. Target device memory 208 includes both non-volatile memory 212 and volatile memory. The non-volatile memory 212 stores the program instructions that CPU 204 fetches and executes, including program instructions for cable mismatch detection/correction firmware 216 of the present invention. Examples of non-volatile memory 212 include, but are not limited to, flash memory, SD, EPROM, EEPROM, hard disks, and NOVRAM. Volatile memory stores various data structures and in some embodiments may contain a read cache, a write cache, or both. Examples of volatile memory include, but are not limited to, DDR RAM, DDR2 RAM, DDR3 RAM, and other forms of temporary memory.

In some embodiments, volatile memory includes a polling timer value 236, and one or more stored cable configurations 240, identified as cable a configuration 240a through cable n configuration 240n.

Target device 144 may have one host interface 220, or multiple host interfaces 220. In some embodiments, target device 144 may have one or more protocol controller devices 232, which pass signals to other devices 132, 140. In other embodiments, protocol controller 232 may not be present. In a preferred embodiment, protocol controller 232 is a SAS protocol controller 232.

Storage enclosures 128, 148 include a number of storage devices 132. In one embodiment, storage enclosures 128, 148 include up to twelve (12) storage devices 132. In another embodiment, storage enclosures 128, 148 include twenty-four (24) storage devices 132. However, the number of storage devices 132 may be less or more than twelve or twenty four. Multiple storage enclosures 128, 148 may be daisy chained with daisy chain buses 156a, 156b, 156c in order to increase the number of storage devices 132 controlled by target device 144.

Expanders 140a, 140b, and 140c transfer data, commands, and status to and from storage devices 132. In general, the transmit and receive paths to storage devices 132 are single lane SAS connections. However, in the future it is possible each transmit or receive path could be a multiple lane SAS connection 152, or some other form of connection.

Each target device 144 also includes a management controller 224. CPU 204 reports status changes and errors to the management controller 224, which communicates status changes for target device 144 and errors to one or more administrative computers 116, 136 over management network 228. Management controller 224 also receives commands from one or more administrative computers 116, 136 over management network 228. A user or system administrator utilizes administrative computers 116, 136 to interact with the target device 144. Management network 228 is any bus or network capable of transmitting and receiving data from a remote computer, and includes Ethernet, RS-232, Fibre Channel, ATM, SAS, SCSI, Infiniband, or any other communication medium. Such a communication medium may be either cabled or wireless. In some target devices 144, status changes and errors are reported to an administrative computer 116, 136 through host interface 220 over multi-lane link 152.

Referring now to FIG. 3, a block diagram illustrating components of a host interface 220 in accordance with embodiments of the present invention is shown. Target device 144 may include multiple host interfaces 220. Host interface 220 includes a protocol controller 304, which manages data transfers between target device 144 and each host computer 116, 136 or initiator device. Protocol controller 304 is controlled by CPU 204, and may be disabled by CPU 204 from receiving or transmitting any data to or from any initiator device cabled to target device 144.

Each protocol controller 304 may support several multi-PHY cable receptacles 312, each of which accepts a multi-PHY cable 316. In the embodiment illustrated in FIG. 3 there are four PHYs 308 between each cable receptacle 312 and the protocol controller 304, with four cable receptacles 312 identified as cable receptacles 312a-d. Three of the four cable receptacles 312a, 312b, and 312d each receive cables 316a, 316b, and 316c, respectively.

Referring now to FIG. 4a, a block diagram illustrating a correct cable configuration incorporating a straight cable in accordance with embodiments of the present invention is shown. Although a host interface 220 is illustrated in FIG. 4a, it should be understood that any number of host interfaces 220 may be included in the present invention.

Target device 132, 144 includes a host interface 220 and target device memory 208, which includes stored cable configuration 240. One end of straight cable 316a is plugged into host interface 220 of target device 132, 144. The opposite end of straight cable 316a includes port 404, which plugs into an initiator device 136. Straight cable 316a includes EEPROM 408, which stores an indication identifying cable 316a is a straight cable incorporating four PHYs 308. Correct cable configurations of the present invention match stored cable configuration 240 with the corresponding cable type identifier stored in EEPROM 408. In the example illustrated in FIG. 4a, the stored cable configuration 240 indicates a straight 1×4 cable and the cable type identifier stored in EEPROM 408 indicates a straight 1×4 cable.

Referring now to FIG. 4b, a block diagram illustrating a correct cable configuration incorporating a fanout cable in accordance with embodiments of the present invention is shown. In this case, the cable plugged into host interface 220 is a fanout cable 316b with four PHYs 308, organized as two PHYs 308 per each port 404a, 404b. This type of fanout cable 316b supports two initiator devices 136, each plugged into a port 404 of fanout cable 316b. Correct cable configurations of the present invention match stored cable configuration 240 with the corresponding cable type identifier stored in EEPROM 408. In the example illustrated in FIG. 4b, the stored cable configuration 240 indicates a fanout 2×2 cable and the cable type identifier stored in EEPROM 408 indicates a fanout 2×2 cable.

Referring now to FIG. 5a, a block diagram illustrating a mismatched cable configuration incorporating a straight cable 316a in accordance with embodiments of the present invention is shown. Target device 132, 144 includes a host interface 220 and target device memory 208, which includes stored cable configuration 240. One end of straight cable 316a is plugged into host interface 220 of target device 132, 144. The opposite end of straight cable 316a includes port 404, which plugs into an initiator device 136. Straight cable 316a includes EEPROM 408, which stores an indication identifying cable 316a is a straight cable incorporating four PHYs 308. Mismatched cable configurations of the present invention mismatch stored cable configuration 240 with the corresponding cable type identifier stored in EEPROM 408. In the example illustrated in FIG. 5a, the stored cable configuration 240 indicates a fanout 2×2 cable and the cable type identifier stored in EEPROM 408 indicates a straight 1×4 cable.

Referring now to FIG. 5b, a block diagram illustrating a mismatched cable configuration incorporating a fanout cable 316b in accordance with embodiments of the present invention is shown. In this case, the cable plugged into host interface 220 is a fanout cable 316b with four PHYs 308, organized as two PHYs 308 per each port 404a, 404b. This type of fanout cable 316b supports two initiator devices 136, each plugged into a port 404 of fanout cable 316b. Mismatched cable configurations of the present invention mismatch stored cable configuration 240 with the corresponding cable type identifier stored in EEPROM 408. In the example illustrated in FIG. 5b, the stored cable configuration 240 indicates a straight 1×4 cable and the cable type identifier stored in EEPROM 408 indicates a fanout 2×2 cable.

Referring now to FIG. 6a, a block diagram illustrating PHY groups 604,608 in a 4-lane to dual 2-lane fanout cable 316 when the stored cable configuration 240 is in 2×2 fanout cable mode in accordance with embodiments of the present invention is shown. A PHY group is an exclusive grouping of one or more PHYs within a cable receptacle 312. A given PHY 308 may be included in only one PHY group. The number of PHY groups in a cable receptacle 312 is the greater of the number of PHY groups identified in the stored cable configuration 240 and the EEPROM 408. For example, if the stored cable configuration 240 is a 2×2 fanout cable (i.e. 2 PHY groups, with 2 PHYs per PHY group), and the EEPROM 408 cable type identifier is a 2×2 fanout cable, the number PHY groups is 2—the greater of 2 and 2).

FIG. 6a illustrates two PHY groups in a 2×2 fanout cable, a current PHY group 604 and another (or "other") PHY group 608. The number of PHY groups in a cable 316 reflects the maximum number of initiator devices 316 that may be supported by the cable 316. Therefore, a cable 316 that can support up to four initiator devices 136 has four PHY groups identified in the cable type of EEPROM 408. The current PHY group 604 is the PHY group that includes the first PHY 308 that went active in blocks 912, 1012, and 1108 of FIGS. 9, 10, and 11, respectively.

Referring now to FIG. 6b, a block diagram illustrating PHY groups in a 4-lane to quad 1-lane fanout cable 316 when the stored cable configuration 240 is in 2×2 fanout cable mode in accordance with embodiments of the present invention is shown. The fanout cable 316 includes a current PHY group 612 and other PHY groups 616. The other PHY groups 616 include three separate PHYs 308. Here, if the stored cable configuration 240 is a 2×2 fanout cable (i.e. 2 PHY groups, with 2 PHYs per PHY group), and the EEPROM 408 cable type identifier is a 1×4 straight cable, the number PHY groups is 2—the greater of 2 and 1). The current PHY group 612 is the PHY group that includes the first PHY 308 that went active in blocks 912, 1012, and 1108 of FIGS. 9, 10, and 11, respectively.

Referring now to FIG. 6c, a block diagram illustrating PHY groups in a 4-lane straight cable 316 when the stored cable configuration 240 is in 2×2 fanout cable mode in accordance with embodiments of the present invention is shown. The straight cable 316 includes a current PHY group 620 including two PHYs 308 and another PHY group 624 including two PHYs 308. Here, if the stored cable configuration 240 is a 2×2 fanout cable (i.e. 2 PHY groups, with 2 PHYs per PHY group), and the EEPROM 408 cable type identifier is a 1×4 straight cable, the number PHY groups is 2—the greater of 2 and 1). The current PHY group 620 is the PHY group that includes the first PHY 308 that went active in blocks 912, 1012, and 1108 of FIGS. 9, 10, and 11, respectively.

Referring now to FIG. 7, a flowchart illustrating a generalized polling process to detect cable mismatch in accordance with embodiments of the present invention is shown. The context of the polling timer would be that all PHYs 308 would be automatically disabled upon the target device 144 detecting a mismatch between the stored cable configuration 240 and the cable type stored in the cable EEPROM 408. It should be understood that the process of FIG. 7 is independently executed for each cable receptacle 312 in a host interface 220. Flow begins at block 704.

At block 704, the target device 144 initializes a polling timer. The polling timer is typically executed in firmware by CPU 204, but in other embodiments may be a hardware timer within the target device 144. The timer may be configured to count up to a predetermined value and time out, or countdown from a predetermined value to zero and time out. In the preferred embodiment, the polling timer value is approximately ten seconds. The polling timer value reflects the system attempting to determine, in a timely manner, whether the cable mismatch was rectified, or not. Flow proceeds to decision block 708.

At decision block 708, the target device 144 determines if the polling timer has timed out. If the polling timer has timed out, then flow proceeds to block 712. If the polling timer has not timed out, then flow proceeds to decision block 708 to continue to check for time out.

At block 712, the target device 144 reads the stored cable configuration 240 from target device memory 208. Flow proceeds to block 716.

At block 716, the target device 144 attempts to read the cable type from the cable EEPROM 408. The cable type is programmed into the EEPROM 408 to identify the specific type of cable. The cable type includes identification of whether the cable 316 is a straight cable or fanout cable, the number of PHY groups in the cable, and the number of PHYs per PHY group. Flow proceeds to decision block 720.

At decision block 720, the target device 144 determines if the EEPROM 408 read was successful. If the EEPROM 408 read was successful, then flow proceeds to block 724. If the EEPROM 408 read was not successful, then flow proceeds to block 728.

At block 724, the target device 144 determines if the stored cable configuration 240 does not match the cable type stored in the EEPROM 408. Flow ends at block 724.

At block 728, the target device 144 resets the polling timer in order to begin counting again. Flow proceeds to decision block 708 to wait until the polling timer times out.

Referring now to FIG. 8, a flowchart illustrating a generalized PHY up process to detect cable mismatch in accordance with embodiments of the present invention is shown. Upon initial target device 144 boot, all PHYs 308 are not disabled and it is therefore more efficient to rely on a PHY 308 up condition instead of a polling process as described with respect to FIG. 7. Flow begins at block 804.

At block 804, the target device 144 detects a PHY 308 comes up within a cable receptacle 312. This means that the target device PHY is not disabled, a cable 316 is attached to the cable receptacle 312, and initiator device 136 is attached to the cable 316. Flow proceeds to block 808.

At block 808, the target device 144 reads the stored cable configuration 240 corresponding to the PHY 308/cable receptacle 312 from target device memory 208. This informs the target device 144 of what the cable 316 is expected to be. Flow proceeds to block 812.

At block 812, the target device 144 reads the cable type from the cable EEPROM 408 corresponding to the PHY 308/cable receptacle 312. This informs the target device 144 what the actual cable type is. Flow proceeds to block 816.

At block 816, the target device 144 determines if the stored cable configuration 240 does not match the cable type stored in the EEPROM 408. Flow ends at block 816.

FIGS. 7 and 8 illustrate the improved efficiency of determining a cable mismatch after a PHY up detection event, instead of regular polling for a mismatch between the stored cable configuration 240 and the cable type EEPROM 408. Polling requires execution of more software instructions by CPU 204 as well as periodic execution of the polling routine until such time as the stored cable configuration 240 can be compared to the cable type EEPROM 408.

Referring now to FIG. 9, a flowchart illustrating a cable mismatch detection process in accordance with a first embodiment of the present invention is shown. Flow begins at block 904.

At block 904, all target device PHYs 308 in a cable receptacle 312 are currently inactive. Inactive means either a cable 316 is not plugged into the cable receptacle 312, no initiator devices 136 are plugged into the cable 316, or the target device 144 has disabled all target device PHYs 308 in the cable receptacle 312. Flow proceeds to block 908.

At block 908, the target device 144 initializes a timer with a count value. The count value corresponds to a length of time the target device 144 will check for disabled PHYs 308 in the cable receptacle 312. In the preferred embodiment, the timer counts for approximately 10 seconds. A lower timer count value is preferable for responsiveness, although timer count values of less or more than 10 seconds may be used. Flow proceeds to decision block 912.

At decision block 912, the target device 144 determines if a PHY 308 in the cable receptacle 312 becomes active. Active means a cable 316 is plugged into the cable receptacle 312, at least one initiator device 136 is plugged into the cable, and the PHY 308 is not disabled by the target device 144. If a PHY 308 in the cable receptacle 312 becomes active, then flow proceeds to decision block 916. If a PHY 308 in the cable receptacle 312 does not become active, then flow proceeds to decision block 944.

At block 916, the target device 144 determines if there is a mismatch between the cable type stored in the EEPROM 408 and the stored cable configuration 240. If there is a mismatch between the cable type stored in the EEPROM 408 and the stored cable configuration 240, then flow proceeds to block 928. If there is not a mismatch between the cable type stored in the EEPROM 408 and the stored cable configuration 240, then flow proceeds to block 920.

At block 920, the target device 144 re-enables PHYs 308 in the cable receptacle 312 if any PHYs 308 are disabled. Flow proceeds to block 924.

At block 924, if any PHYs 308 were previously disabled, target device 144 notifies a user that a mismatch is been corrected. In most cases, a user utilizes a management computer 136 to access and receive updates from the target device 144 over management network 228. Flow ends at block 924.

At block 928, the target device 144 disables all other PHY groups 608, 616, 624 corresponding to the cable receptacle 312. The other PHY groups 608, 616, 624 are all of the PHY groups in the cable receptacle 312 that do not include the PHY 308 that became active in decision block 912. Disabling a PHY group 608, 616, 624 prevents all PHYs 308 in the PHY group 608, 616, 624 from transmitting or receiving data. Flow proceeds to block 932.

At block 932, the target device 144 notifies a user that other PHY groups 608, 616, 624 in the cable receptacle 312 have been disabled, and a cable 316 mismatch has occurred. Flow proceeds to block 936.

At block 936, PHYs 308 in the other PHY groups 608, 616, 624 in the cable receptacle 312 are disabled. At this point, the user can either change the cable 316 to a different cable type or change the stored cable configuration 240. Flow proceeds to decision block 940.

At decision block 940, the target device 144 determines if the user changes the cable 316. If the user changes the cable 316, then flow proceeds to block 904 to reset the timer prior to resuming the cable mismatch detection process. PHYs 308 become inactive when a user changes the cable 316. If the user does not change the cable 316, then flow proceeds to decision block 960 to check the stored cable configuration 240.

At decision block 944, the target device 144 determines if there any PHYs 308 in the cable receptacle 312 that are disabled. If there are any PHYs 308 in the cable receptacle 312 that are disabled, then flow proceeds to block 948. If there are not any PHYs 308 in the cable receptacle 312 that are disabled, then flow proceeds to decision block 912 to check if a PHY 308 in the cable receptacle 312 became active.

At block 948, the target device 144 decrements the timer. In alternative count-up embodiments, the target device 144 increments the timer. Flow proceeds to decision block 952.

At decision block 952, the target device 144 determines if the timer times out. The timer times out in a count-down embodiment when the count reaches a value of zero. The timer times out in a count-up embodiment when the count reaches a predetermined value corresponding to the desired length of the count in time. If the timer times out, then flow proceeds to block 956. If the timer does not time out, then flow proceeds to decision block 912 to check if a PHY 308 in the cable receptacle 312 became active.

At block 956, the target device 144 enables all PHY groups, 608, 612, 616, 620, 624 in the cable receptacle 312. PHY groups are able to transmit and receive data when enabled. Flow proceeds to decision block 912 to check if a PHY 308 in the cable receptacle 312 became active.

At decision block 960, the target device 144 determines if the user changes the stored cable configuration 240. If the user changes the stored cable configuration 240, then flow proceeds to decision block 916 to restart the cable mismatch detection process. If the user does not change the stored cable configuration 240, then flow proceeds to block 936 to continue to check for either a changed cable 316 or a changed stored cable configuration 240.

Referring now to FIG. 10, a flowchart illustrating a cable mismatch detection process in accordance with a second embodiment of the present invention is shown. Flow begins at block 1004.

At block 1004, all target device PHYs 308 in a cable receptacle 312 are currently inactive. Inactive means either a cable 316 is not plugged into the cable receptacle 312, no initiator devices 136 are plugged into the cable 316, or the target device 144 has disabled all target device PHYs 308 in the cable receptacle 312. Flow proceeds to block 1008.

At block 1008, the target device 144 initializes a timer with a count value. The count value corresponds to a length of time the target device 144 will check for disabled PHYs 308 in the cable receptacle 312. In the preferred embodiment, the timer counts for approximately 10 seconds. Flow proceeds to decision block 1012.

At decision block 1012, the target device 144 determines if a PHY 308 in the cable receptacle 312 becomes active. Active means a cable 316 is plugged into the cable receptacle 312, at least one initiator device 136 is plugged into the cable, and the PHY 308 is not disabled by the target device 144. If a PHY 308 in the cable receptacle 312 becomes active, then flow proceeds to decision block 1016. If a PHY 308 in the cable receptacle 312 does not become active, then flow proceeds to decision block 1044.

At block 1016, the target device 144 determines if there is a mismatch between the cable type stored in the EEPROM 408 and the stored cable configuration 240. If there is a mismatch between the cable type stored in the EEPROM 408 and the stored cable configuration 240, then flow proceeds to block 1028. If there is not a mismatch between the cable type stored in the EEPROM 408 and the stored cable configuration 240, then flow proceeds to block 1020.

At block 1020, the target device 144 re-enables PHYs 308 in the cable receptacle 312 if any PHYs 308 are disabled. Flow proceeds to block 1024.

At block 1024, if any PHYs 308 were previously disabled, target device 144 notifies a user that a mismatch is been corrected. In most cases, a user utilizes a management computer 136 to access and receive updates from the target device 144 over management network 228. Flow ends at block 1024.

At block 1028, the target device 144 disables all other PHY groups 608, 616, 624 corresponding to the cable receptacle 312. The other PHY groups 608, 616, 624 are all of the PHY groups in the cable receptacle 312 that do not include the PHY 308 that became active in decision block 912. Disabling a PHY group 608, 616, 624 prevents all PHYs 308 in the PHY group 608, 616, 624 from transmitting or receiving data. Flow proceeds to block 1032.

At block 1032, the target device 144 notifies a user that other PHY groups 608, 616, 624 in the cable receptacle 312 have been disabled, and a cable 316 mismatch has occurred. Flow proceeds to block 1036.

At block 1036, PHYs 308 in the other PHY groups 608, 616, 624 in the cable receptacle 312 are disabled. At this point, the user can change the cable 316 to a different cable type. Flow proceeds to decision block 1040.

At decision block 1040, the target device 144 determines if the user changes the cable 316 within a predefined timeframe. In the preferred embodiment, the preferred timeframe is approximately 30-60 seconds, assuming that a reboot is not required. If the user changes the cable 316 within the predefined timeframe, then flow proceeds to block 1004 to reset the timer prior to resuming the cable mismatch detection process. If the user does not change the cable 316 within the predefined timeframe, then flow proceeds to block 1060 to change the stored cable configuration 240.

At decision block 1044, the target device 144 determines if there any PHYs 308 in the cable receptacle 312 that are disabled. If there is any PHYs 308 in the cable receptacle 312 that are disabled, then flow proceeds to block 1048. If there are not any PHYs 308 in the cable receptacle 312 that are disabled, then flow proceeds to decision block 1012 to check if a PHY 308 in the cable receptacle 312 became active.

At block 1048, the target device 144 decrements the timer. In alternative count-up embodiments, the target device 144 increments the timer. Flow proceeds to decision block 1052.

At decision block 1052, the target device 144 determines if the timer times out. The timer times out in a count-down embodiment when the count reaches a value of zero. The timer times out in a count-up embodiment when the count reaches a predetermined value corresponding to the desired length of the count in time. If the timer times out, then flow proceeds to block 1056. If the timer does not time out, then flow proceeds to decision block 1012 to check if a PHY 308 in the cable receptacle 312 became active.

At block 1056, the target device 144 enables all PHY groups, 608, 612, 616, 620, 624 in the cable receptacle 312. PHY groups are able to transmit and receive data when enabled. Flow proceeds to decision block 1012 to check if a PHY 308 in the cable receptacle 312 became active.

At block 1060, the target device 144 automatically changes the stored cable configuration 240 to the other cable type (i.e. the cable type stored in the EEPROM 408). This includes changing the configuration of a fanout cable (from 1×4 to 2×2, for example), even if the stored cable configuration 240 and the cable type 408 both include "fanout cable" in their respective description. Flow proceeds to decision block 1016 to restart the cable mismatch detection process.

Referring now to FIG. 11, a flowchart illustrating a cable mismatch detection process in accordance with a third embodiment of the present invention is shown. The embodiment of FIG. 11 is an alternative to the embodiments of FIGS. 9 and 10. Flow begins at block 1104.

At block 1104, all target device PHYs 308 in a cable receptacle 312 are currently inactive. Inactive means either a cable 316 is not plugged into the cable receptacle 312, no initiator devices 136 are plugged into the cable 316, or the target device 144 has disabled all target device PHYs 308 in the cable receptacle 312. Flow proceeds to decision block 1108.

At decision block 1108, the target device 144 determines if a PHY 308 in the cable receptacle 312 becomes active. Active means a cable 316 is plugged into the cable receptacle 312, at least one initiator device 136 is plugged into the cable, and the PHY 308 is not disabled by the target device 144. If a PHY 308 in the cable receptacle 312 becomes active, then flow proceeds to decision block 1112. If a PHY 308 in the cable receptacle 312 does not become active, then flow proceeds to decision block 1108 to continue to check for a PHY 308 in the cable receptacle 312 to become active.

At decision block 1112, the target device 144 determines if there is a mismatch between the cable type stored in the EEPROM 408 and the stored cable configuration 240. If there is a mismatch between the cable type stored in the EEPROM 408 and the stored cable configuration 240, then flow proceeds to block 1116. If there is not a mismatch between the cable type stored in the EEPROM 408 and the stored cable configuration 240, then flow proceeds to block 1128.

At block 1116, the target device 144 disables all other PHY groups 608, 616, 624 corresponding to the cable receptacle 312. The other PHY groups 608, 616, 624 are all of the PHY groups in the cable receptacle 312 that do not include the PHY 308 that became active in decision block 912. Disabling a PHY group 608, 616, 624 prevents all PHYs 308 in the PHY group 608, 616, 624 from transmitting or receiving data. Flow proceeds to block 1120.

At block 1120, the target device 144 notifies a user that other PHY groups 608, 616, 624 in the cable receptacle 312 have been disabled, and a cable 316 mismatch has occurred. Flow proceeds to block 1124.

At block 1124, PHYs 308 in the other PHY groups 608, 616, 624 in the cable receptacle 312 become disabled. Flow ends at block 1124.

At block 1128, the target device 144 re-enables PHYs 308 in the cable receptacle 312 if any PHYs 308 are disabled. Flow proceeds to block 1132.

At block 1132, target device 144 notifies a user that a mismatch is been corrected. In most cases, a user utilizes a management computer 136 to access and receive updates from the target device 144 over management network 228. Flow ends at block 1132.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A method for resolving a cable mismatch by a target device, comprising:
   determining, by the target device, that all Physical Interfaces in a cable receptacle are currently inactive, the cable receptacle configured to accept a cable that connects the target device with one or more initiator devices;
   determining, by the target device, that a Physical Interface in the cable receptacle became active, a Physical Interface becomes active comprising a cable is plugged into the cable receptacle and a non-disabled initiator device is plugged into the cable;
   determining, by the target device, if there is a mismatch between a cable type and a stored cable configuration, the cable type being stored in a first memory device of a cable plugged into the cable receptacle, the stored cable configuration being stored in a second memory device in the target device; and
   in response to determining there is a mismatch between the cable type and the stored cable configuration, then:
      disabling, by the target device, all other Physical Interface Groups in the cable receptacle that do not include the Physical Interface that became active, each Physical Interface Group comprising an exclusive grouping of Physical Interfaces within a cable receptacle and mutually exclusive from other Physical Interfaces and Physical Interface Groups; and
      notifying, by the target device, a user that a cable mismatch corresponding to the cable receptacle has occurred;
   in response to determining there is not a mismatch between the cable type and the stored cable configuration, then:
      re-enabling, by the target device, Physical Interfaces in the cable receptacle, if any Physical Interfaces are disabled; and
      notifying, by the target device, a user that a cable mismatch corresponding to the cable receptacle has been corrected.

2. The method for resolving a cable mismatch by a target device of claim 1, wherein the first and second memory devices each comprises an indication of whether the cable type and the stored cable configuration, respectively, are either a straight cable or a fanout cable, the number of Physical Interface Groups, and the number of Physical Interfaces per Physical Interface Group, wherein the straight cable is configured to provide interconnection to only a single initiator device, wherein the fanout cable is configured to provide interconnection to a plurality of initiator devices.

3. The method for resolving a cable mismatch by a target device of claim 2, wherein a mismatch between a cable type and a stored cable configuration comprises at least one of the indications of straight or fanout cable, number of Physical Interface Groups, and the number of Physical Interfaces per Physical Interface Group are different.

4. The method for resolving a cable mismatch by a target device of claim 2, wherein the number of Physical Interface Groups in the cable receptacle is the greater of the number of Physical Interface Groups identified in the first and second memory devices.

5. The method for resolving a cable mismatch by a target device of claim 4, wherein disabling all other Physical Interface Groups in the cable receptacle that do not include the Physical Interface that became active comprises the target device causing a protocol controller coupled to all other Physical Interface Groups in the cable receptacle to prevent receiving and transmitting data through the other Physical Interface Groups.

6. The method for resolving a cable mismatch by a target device of claim 4, wherein each Physical Interface Group of a straight cable is configured to provide interconnection with a single initiator device, wherein each Physical Interface Group of a fanout cable is configured to provide interconnection with a different initiator device.

7. The method for resolving a cable mismatch by a target device of claim 1, wherein the target device comprises a plurality of cable receptacles and resolves cable mismatches in the cable receptacle independent of other cable receptacles of the plurality of cable receptacles.

8. The method for resolving a cable mismatch by a target device of claim 1, wherein all Physical Interfaces in a cable receptacle are currently inactive comprises one of a cable is not plugged into the cable receptacle, no initiators are plugged into the cable, and the target device has disabled all Physical Interfaces in the cable receptacle.

9. A method for resolving a cable mismatch between a target device and one or more initiator devices, comprising:
   determining, by the target device, that all Physical Interfaces in a cable receptacle are currently inactive;
   initializing, by the target device, a timer with a count value; and
   determining, by the target device, if a Physical Interface in the cable receptacle becomes active;
   in response to determining a Physical Interface in the cable receptacle becomes active, then;
      determining, by the target device, if there is a mismatch between a cable type and a stored cable configuration, the cable type being stored in a cable plugged into the cable receptacle, the stored cable configuration being stored in the target device; and
      resolving, by the target device, the mismatch in response to determining there is a mismatch between the cable type and the stored cable configuration;
   in response to determining a Physical Interface in the cable receptacle does not become active, then;
      determining, by the target device, if any Physical Interfaces in the receptacle are disabled, disabled Physical Interfaces being Physical Interfaces whereby the target device caused a protocol controller coupled to the Physical Interfaces to prevent the Physical Interfaces from receiving or transmitting data; and
      in response to determining no Physical Interfaces in the cable receptacle are disabled, then:
         repeating determining if a Physical Interface in the cable receptacle becomes active; and
      in response to determining any Physical Interfaces in the cable receptacle are disabled, then:
         decrementing, by the target device, the timer; and
         determining, by the target device, if the timer times out;
         in response to determining the timer times out, then:
            enabling, by the target device, all Physical Interfaces in the cable receptacle; and
            repeating determining if a Physical Interface in the cable receptacle becomes active; and
         in response to determining the timer does not time out, then:
            repeating determining a Physical Interface in the cable receptacle becomes active.

10. The method for resolving a cable mismatch between a target device and one or more initiator devices of claim 9, wherein the target device comprises a plurality of cable receptacles and resolves cable mismatches in the cable receptacle independent of other cable receptacles of the plurality of cable receptacles.

11. The method for resolving a cable mismatch between a target device and one or more initiator devices of claim 9, wherein all Physical Interfaces in a cable receptacle are currently inactive comprises one of a cable is not plugged into the cable receptacle, no initiators are plugged into the cable, and the target device has disabled all Physical Interfaces in the cable receptacle.

12. The method for resolving a cable mismatch between a target device and one or more initiator devices of claim 9, wherein if there is not a mismatch between the cable type and the stored cable configuration, the method further comprising:
   re-enabling all Physical Interfaces in the cable receptacle, by the target device, if any Physical Interfaces in the cable receptacle are disabled; and
   notifying a user that the mismatch between the cable type and the stored configuration has been corrected, if any Physical Interfaces were previously disabled.

13. The method for resolving a cable mismatch between a target device and one or more initiator devices of claim 9, wherein the cable type and the stored cable configuration each comprises an indication of either a straight cable or a fanout cable, a number of Physical Interface Groups, and a number of Physical Interfaces per Physical Interface Group.

14. The method for resolving a cable mismatch between a target device and one or more initiator devices of claim 13, wherein the straight cable is configured to provide interconnection to only a single initiator device, wherein the fanout cable is configured to provide interconnection to a plurality of initiator devices.

15. The method for resolving a cable mismatch between a target device and one or more initiator devices of claim 13, wherein a Physical Interface Group is an exclusive grouping of one or more Physical Interfaces within a cable receptacle, wherein the number of Physical Interface Groups in the cable receptacle is the greater of the number of Physical Interface Groups identified in the cable type and the stored cable configuration, wherein the cable receptacle provides a plurality of Physical Interface Groups, wherein the plurality of Physical Interface Groups comprises all Physical Interfaces in a cable receptacle.

16. The method for resolving a cable mismatch between a target device and one or more initiator devices of claim 15, wherein if there is a mismatch between the cable type and the stored cable configuration, the method further comprising:
   disabling, by the target device, all other Physical Interface Groups corresponding to the cable receptacle, wherein all other Physical Interface Groups excludes the Physical Interface Group corresponding to the Physical Interface that became active, and
   notifying a user, by the target device, that the other Physical Interface Groups in the cable receptacle have been disabled and a cable mismatch has occurred.

17. The method for resolving a cable mismatch between a target device and one or more initiator devices of claim 16, further comprising:
   determining, by the target device, if the cable has been changed;
   in response to determining the cable has been changed, then:
      repeating determining that all Physical Interfaces in the cable receptacle are currently inactive, initializing the timer with the count value, and determining if a Physical Interface in the cable receptacle becomes active;
   in response to determining the cable has not been changed, then:
      determining, by the target device, if the stored cable configuration has been changed;
      in response to determining the stored cable configuration has not been changed, then:
         disabling Physical Interfaces in the other Physical Interface Groups in the cable receptacle; and
         repeating determining if the cable has been changed;
      in response to determining the stored cable configuration has been changed, then:
         repeating determining if there is a mismatch between the cable type and the stored cable configuration.

18. The method for resolving a cable mismatch between a target device and one or more initiator devices of claim 16, further comprising:
   determining, by the target device, if the cable has been changed within a predetermined timeframe;
   in response to determining the cable has been changed within the predetermined timeframe, then:
      repeating determining that all Physical Interfaces in the cable receptacle are currently inactive, initializing the timer with the count value, and determining if a Physical Interface in the cable receptacle becomes active;
   in response to determining the cable has not been changed within the predetermined timeframe, then:
      changing, by the target device, the stored cable configuration to the other cable type; and
      repeating determining if there is a mismatch between the cable type and the stored cable configuration.

19. The method for resolving a cable mismatch between a target device and one or more initiator devices of claim 18, wherein the other cable type is identified as a fanout cable if the cable type was previously identified as a straight cable, wherein the other cable type is identified as a straight cable if the cable type was previously identified as a fanout cable, wherein the other cable type is identified as a first configuration of fanout cable if the cable type was previously identified as a second configuration of fanout cable.

20. The method for resolving a cable mismatch between a target device and one or more initiator devices of claim 9, wherein the target device corrects the cable mismatch without requiring host interface reset or rebooting the target device.

* * * * *